US008752531B2

(12) United States Patent
Bell et al.

(10) Patent No.: US 8,752,531 B2
(45) Date of Patent: Jun. 17, 2014

(54) SUPERCHARGER COOLING

(71) Applicants: James E. Bell, Upland, CA (US);
Jan-Erik Oscarsson, Saltsjo-Boo (SE)

(72) Inventors: James E. Bell, Upland, CA (US);
Jan-Erik Oscarsson, Saltsjo-Boo (SE)

( * ) Notice: Subject to any disclaimer, the term of this patent is extended or adjusted under 35 U.S.C. 154(b) by 0 days.

(21) Appl. No.: 14/042,196

(22) Filed: Sep. 30, 2013

(65) Prior Publication Data
US 2014/0130782 A1 May 15, 2014

Related U.S. Application Data

(63) Continuation-in-part of application No. 12/567,679, filed on Sep. 25, 2009, now Pat. No. 8,544,453.

(51) Int. Cl.
*F02B 33/00* (2006.01)

(52) U.S. Cl.
USPC ........................... 123/559.1; 123/563

(58) Field of Classification Search
CPC .......... F02B 33/40; F02B 33/38; F02B 33/44; F02B 33/36; F02B 29/0475; F02B 29/0493; F02B 29/0443; F02B 29/0462; F02B 39/04
USPC ............................... 123/559.1, 563
See application file for complete search history.

(56) References Cited

U.S. PATENT DOCUMENTS

| 3,462,072 | A | * | 8/1969 | Schibbye | 418/98 |
| 4,394,113 | A | * | 7/1983 | Bammert | 418/98 |
| 4,893,589 | A | | 1/1990 | Spinnler | |
| 5,261,356 | A | * | 11/1993 | Takahashi et al. | 123/41.31 |
| 6,293,264 | B1 | * | 9/2001 | Middlebrook | 123/563 |
| 6,408,832 | B1 | * | 6/2002 | Christiansen | 123/563 |
| 6,663,366 | B2 | * | 12/2003 | Okada et al. | 418/83 |
| 7,278,472 | B2 | | 10/2007 | Meshenky et al. | |
| 7,469,689 | B1 | * | 12/2008 | Jones et al. | 123/559.1 |
| 8,113,183 | B2 | * | 2/2012 | Prior et al. | 123/559.1 |
| 2006/0157036 | A1 | * | 7/2006 | Andersen | 123/563 |
| 2008/0060622 | A1 | * | 3/2008 | Prior | 123/559.1 |
| 2009/0004038 | A1 | * | 1/2009 | Prior et al. | 418/85 |
| 2010/0018509 | A1 | * | 1/2010 | Prior et al. | 123/559.1 |

FOREIGN PATENT DOCUMENTS

| DE | 10001063 | | 7/2001 | |
| DE | 10001063 | A1 * | 7/2001 | F02B 33/38 |
| DE | 102004005518 | A1 * | 9/2005 | F02B 33/06 |
| DE | 102006021456 | A1 * | 11/2007 | |
| WO | WO 2013/042968 | | 3/2013 | |

OTHER PUBLICATIONS

Machine Translation of DE 102006021456, Translated on Mar. 17, 2014.*

* cited by examiner

*Primary Examiner* — Thomas Denion
*Assistant Examiner* — Patrick Maines
(74) *Attorney, Agent, or Firm* — Kenneth L. Green

(57) ABSTRACT

A supercharger cooling system provides a path for coolant from an air/coolant heat exchanger to a supercharger intercooler and then loops around the supercharger housing proximal to a hot outlet end of the supercharger and back to the heat exchanger. The heat exchanger may be a dedicated air/coolant heat exchanger or be a vehicle radiator. The intercooler is sandwiched between the supercharger and intake manifold and cools the flow of hot compressed air from the supercharger into the intake manifold. The supercharger cooling loop cools the bearings and seals, the forward ends of the male and female rotors, and the male and female rotor gears. The cooling loop is preferably located between the supercharger rotors and the rotor drive gears to form a barrier to heat. A dedicated pump cycles the coolant flow and restrictions control the flow of coolant to the supercharger.

16 Claims, 8 Drawing Sheets

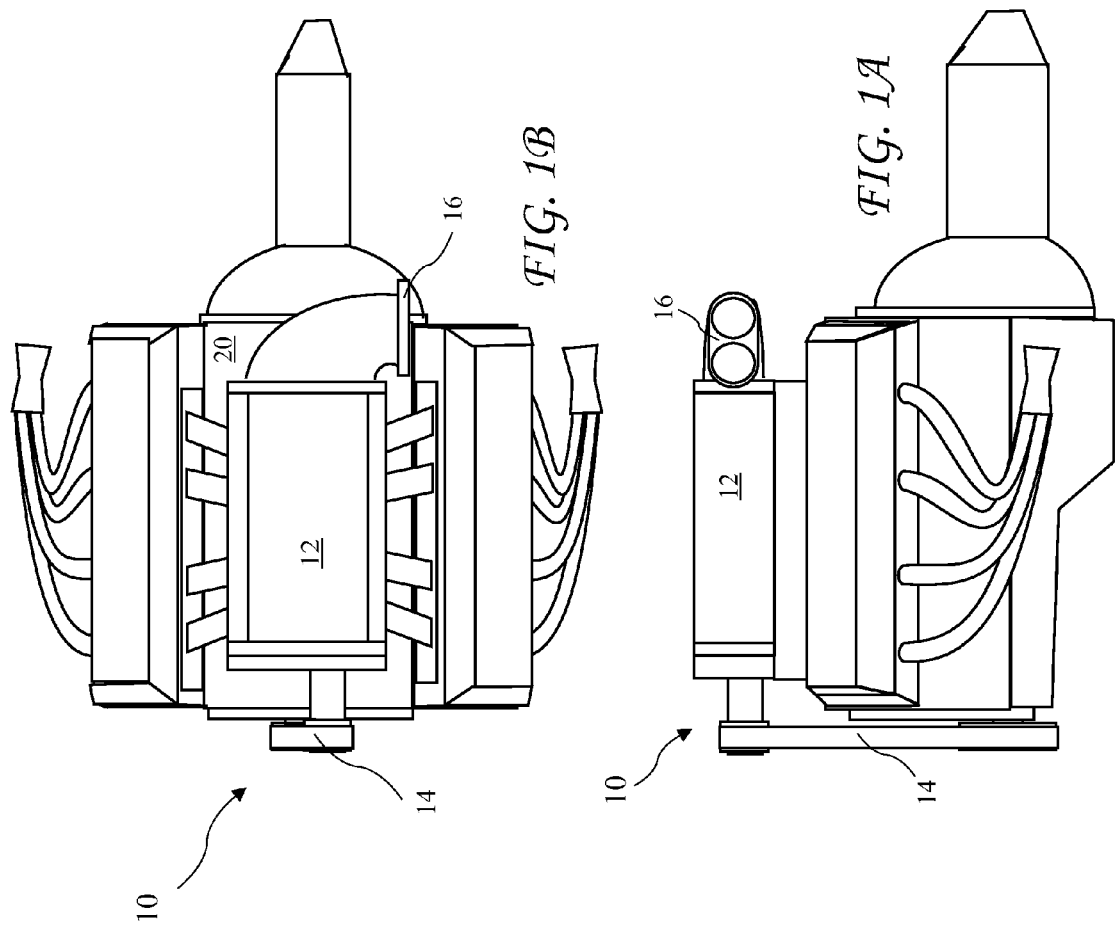
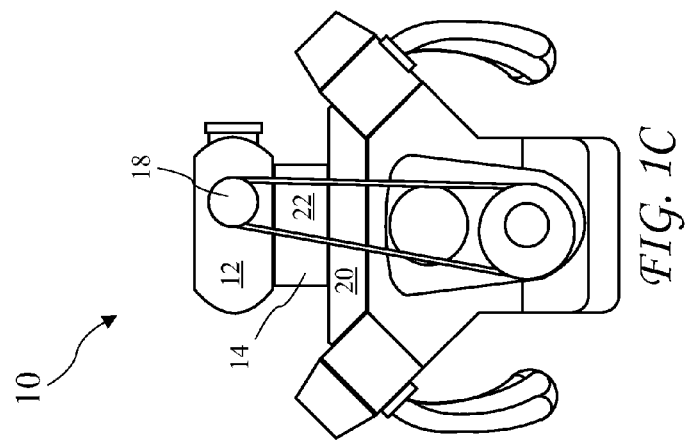
FIG. 1A
FIG. 1B
FIG. 1C

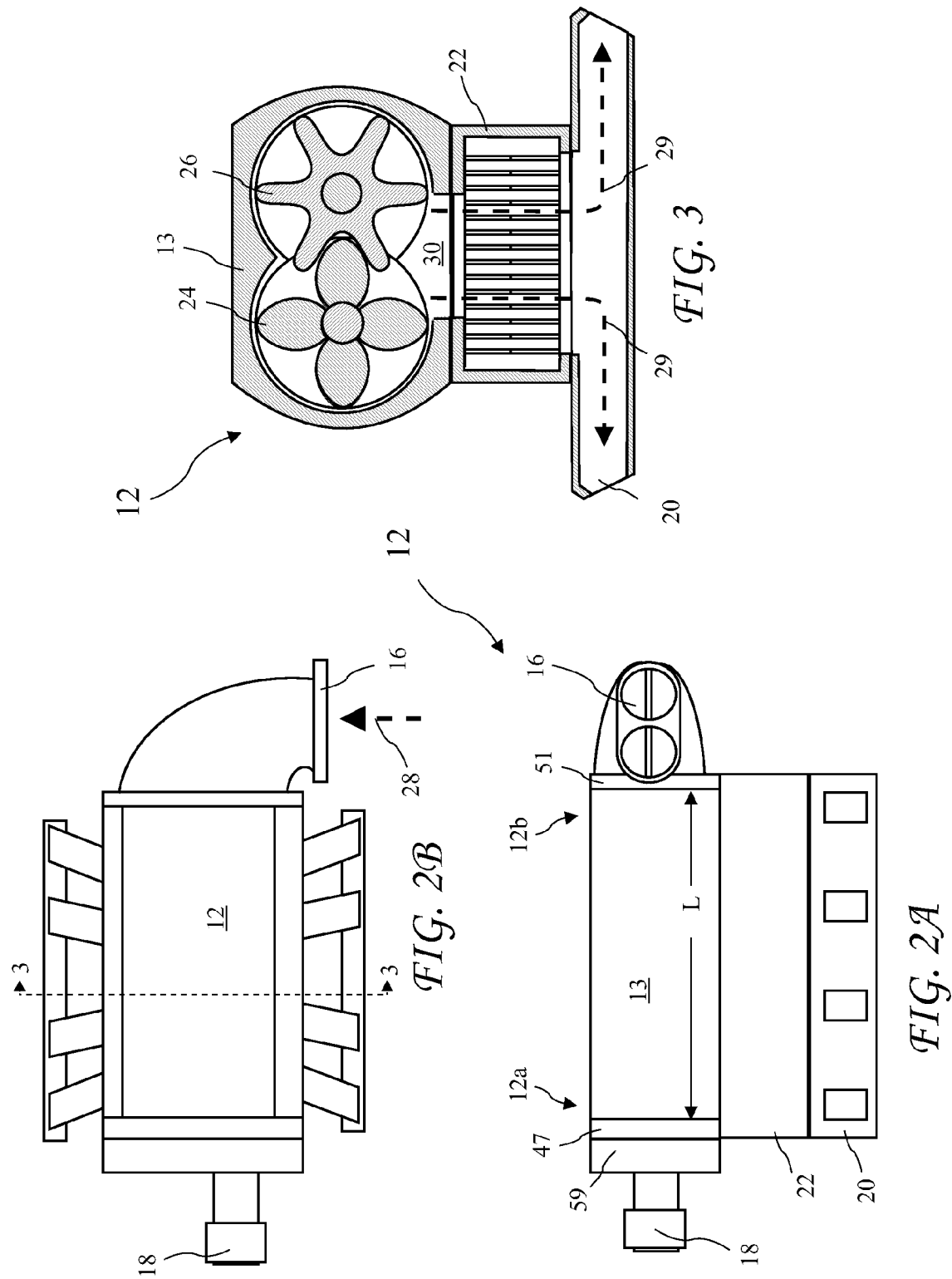

SUPERCHARGER COOLING

CROSS-REFERENCE TO RELATED APPLICATIONS

The present application is a Continuation In Part of U.S. patent application Ser. No. 12/567,679 filed Sep. 25, 2009, which application is incorporated in its entirety herein by reference.

BACKGROUND OF THE INVENTION

The present invention relates to supercharger cooling and in particular to cooling a hotter end of a supercharger including two or more rotating rotors.

Modern roots supercharger have improved efficiency by having an axial inlet at an inlet end and timing gears at an opposite end. Unfortunately, the opposite end is hotter than the inlet end exposing the timing gears to such heat reduced gear and lubricant life.

Twin screw type superchargers draw air into the rear of the supercharger and compress the air as it travels from the rear to the front of the supercharger between supercharger rotors. According to the ideal gas law, the air traveling through the supercharger is heated proportional to the compression of the air inside the supercharger and is thus hotter at the front of the supercharger then at the rear of the supercharger. Further, no supercharger is 100 percent efficient, and although screw type superchargers are more efficient than roots-type superchargers, they remain approximately 70 to 80 percent efficient, which means that if the ideal temperature increase is 100 degrees, the actual temperature increase in 20 to 30 percent greater (in terms of absolute temperature). This temperature variation from the front and the rear of the supercharger results in a corresponding unequal heating of supercharger components, and as a result, unequal expansion of the supercharger components and an accompanying variation in clearances (for example, rotors, cases, front plate, gears, bearings, and the like) between supercharger components. The rotor bearing are interference fit, and when the end cover becomes hot enough, the bearing may rotate in the bearing seats, damaging the seats, and causing the rotors to contact and destroy the supercharger.

When the front plate expands from heat, gears positioned by the front plate experiences an increased gear clearance. Correct gear positions are critical in a twin screw supercharger because the gear positions determine the location of the male and female rotors and their separation. Excessive gear clearance may also result in rotor contact, and proper operation of the supercharger requires that the rotors remain in phase with each other throughout the operating temperature range of the supercharger, which is between 100° F. and 450° F.

A possible solution to the variation of clearances with temperature is to increase rotor to rotor clearance to compensate for the temperature variation over the entire temperature range of supercharger operation. Unfortunately increasing the clearances in a twin screw type supercharger reduces supercharger efficiency. Further, increasing gear clearance results in noisy supercharger operation which is often objectionable to a driver, and accelerates wear of the gears.

Further, the rotors of twins screw type superchargers are generally made from aluminum. The aluminum rotors generally have 0.003 inches to 0.004 inches of clearance and thus controlling the expansion of the rotors, regardless of the clearances between gears, has been an issue with the twin screw type superchargers for decades. Greater than ideal clearances have been incorporated into the supercharger designed to deal with rotor expansion. Unfortunately these large clearances reduce supercharger efficiency resulting in hotter air charges, lower output, and higher power requirement for operating the supercharger. Further, should the rotors contact each other due to excessive expansion, the supercharger is generally destroyed.

The front (output) or discharge side of the supercharger is the hottest and rotor contact always occurs towards the front of the supercharger. The rear (inlet) or intake is ingesting cooler ambient air so there is generally no rotor contact at the rear end of the supercharger. And, the higher the temperatures inside the supercharger, the more severe the rotor contact and the farther the contact reaches from the rear to the front of the supercharger.

The rotors fore and aft shafts and bearings support and stabilize the positions of the rotors. Unfortunately, the front plate having a higher temperature expands more than the rear plate which is closer to ambient air temperature. This temperature imbalance accompanied by the expansion imbalance causes the front of the rotors to separate more than the rear of the rotors. The rotor gears are attached to the front of the rotors and as a result experienced increased gear lash as the fronts of the rotors separate. Both the gear lash and the rotor expansion move the rotors outward closer to the supercharger case and the timing change from the excess gear lash results in circumferentially excess movement of one rotor or in relation to the other.

In addition to loss of efficiency and damage to the supercharger, the increased temperatures shorten the life of supercharger seals.

The front case of the supercharger contains the oil used to lubricate the gears and bearings. Friction from the rotating gears, bearings, and seals heat the oil, and higher supercharger rpm, greater boost, and higher air temperature at the front of the supercharger, further contribute to higher oil temperature. These effects combine to make controlling the temperature of the twin screw supercharger extremely difficult.

A possible solution to cooling the supercharger is to provide a pressurized flow of engine oil to the supercharger gears. Unfortunately, this approach requires external lines to provide a source of pressurized oil to the supercharger, and external drain lines from the supercharger to the engine oil pan to drain the oil from the supercharger, which create potential oil leaks. Further, additional heating of engine oil raises oil temperature and affects oil flow reducing the cooling affect of the oil.

Thus, a need remains for cooling the front (output) end of a screw type supercharger.

BRIEF SUMMARY OF THE INVENTION

The present invention addresses the above and other needs by providing a supercharger cooling system which provides a path for coolant from an air/coolant heat exchanger to a supercharger intercooler and then loops around the supercharger housing proximal to a hot outlet end of the supercharger and back to the heat exchanger. The heat exchanger may be a dedicated air/coolant heat exchanger or be a vehicle radiator. The intercooler is sandwiched between the supercharger and intake manifold and cools the flow of hot compressed air from the supercharger into the intake manifold. The supercharger cooling loop cools the bearings and seals, the forward ends of the male and female rotors, and the male and female rotor gears. The cooling loop is preferably located between the supercharger rotors and the rotor drive gears to form a barrier to heat. A dedicated pump cycles the coolant flow and restrictions control the flow of coolant to the supercharger.

In accordance with one aspect of the invention, there is provided a system for circulating engine coolant generally at 160 degrees Fahrenheit to 200 degrees Fahrenheit to the hot front (outlet end) of the supercharger. The cooling provided reduces the temperatures of the rotor bearings, seals, and gears. Providing the coolant flow to the outlet end wall of the supercharger provides a barrier to heat thereby improving performance and reduces wear and failures.

In accordance with another aspect of the invention, there is provided a system for circulating engine coolant through the outlet end wall of the supercharger. The outlet end wall includes seats for the outlet end rotor bearings and separates the rotor drive gears from the hot compressed air in the outlet end of the supercharger. Preventing overheating of the outlet end wall maintains proper rotor centerdistance thereby improving performance and reduces wear and failures.

In accordance with yet another aspect of the invention, there is provided the a system for circulating engine coolant through the outlet end wall of the supercharger. The outlet end wall separates the outlet end wall from the hot compressed air in the outlet end of the supercharger. Cooling the outlet end wall provides a barrier to heat reaching the rotor drive gears and lubricating oil inside the discharge side cover which lubricates the rotor drive gears. Such cooling improves lubrication and extends the life of the lubricating oil.

In accordance with still another aspect of the invention, there is provided the a system for circulating engine coolant through a supercharger housing proximal to the outlet end wall of the supercharger. Cooling the housing proximal to the outlet end wall provides a barrier to heat reaching the rotor drive gears and lubricating oil inside the discharge side cover which lubricates the rotor drive gears. Such cooling improves lubrication and extends the life of the lubricating oil.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a side view of a supercharged engine according to the present invention.

FIG. 1B is a top view of the supercharged engine according to the present invention.

FIG. 1C is a front view of the supercharged engine according to the present invention.

FIG. 2A is a side view of a supercharger, intercooler, and intake manifold according to the present invention.

FIG. 2B is a top view of the supercharger, intercooler, and intake manifold according to the present invention.

FIG. 3 is a cross-sectional view of the supercharger, intercooler, and intake manifold according to the present invention taken along line 3-3 of FIG. 2B.

Corresponding reference characters indicate corresponding components throughout the several views of the drawings.

DETAILED DESCRIPTION OF THE INVENTION

Figure 4:
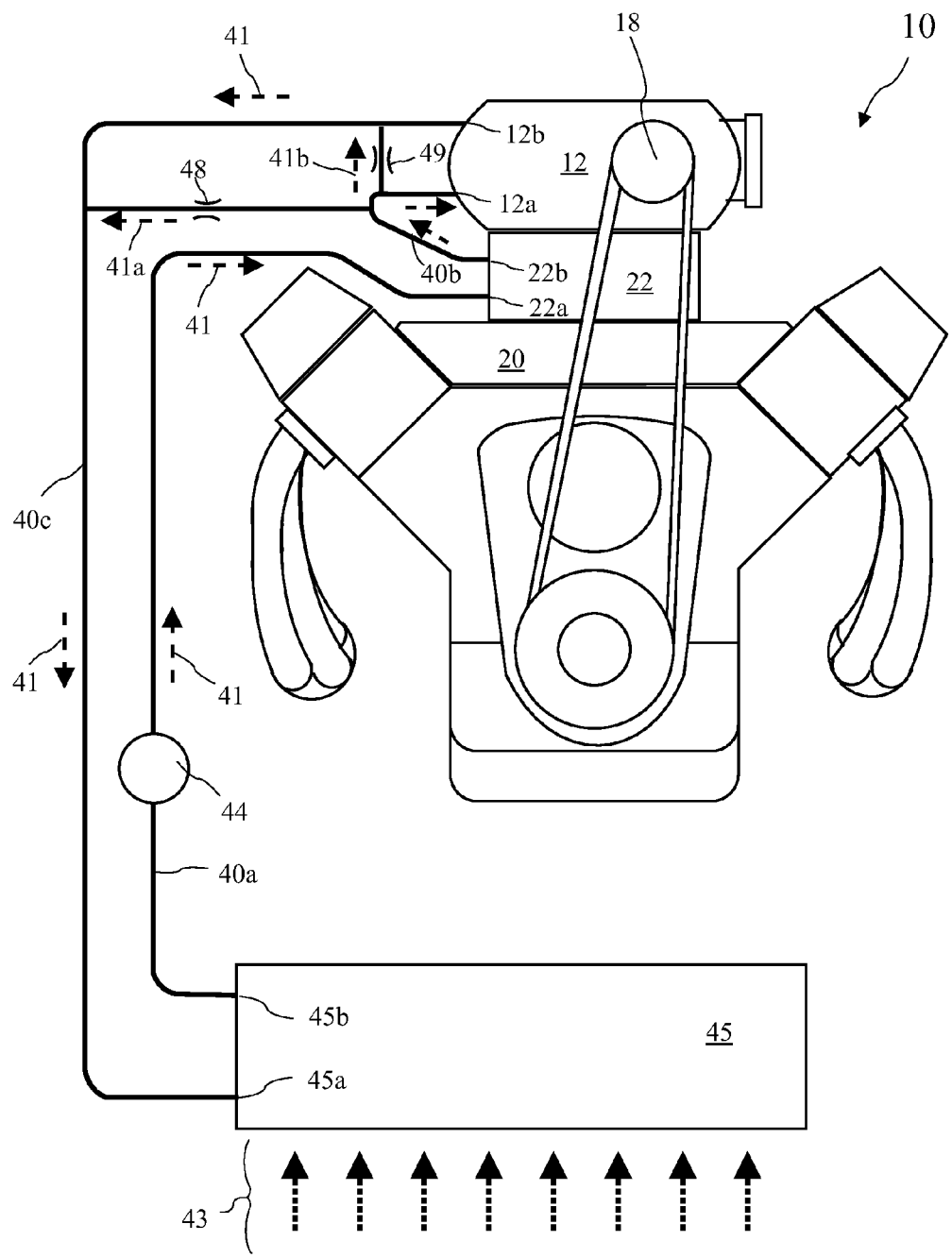
FIG. 4 shows the supercharged engine, a heat exchanger, and coolant lines according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A side view of a supercharged engine 10 according to the present invention is shown in FIG. 1A and a top view of the supercharged engine 10 is shown in FIG. 1B. The supercharged engine 10 includes a screw compressor type supercharger 12 attached to an intake manifold 20 through an intercooler 22. The screw compressor type supercharger 12 compresses air received through a throttle body 16 and provides the compressed air to the supercharged engine 10 through the intercooler 22 and intake manifold 20. The screw compressor type supercharger 12 is driven by a belt 14 connecting a crankshaft pulley to a supercharger pulley.

A side view of the screw compressor type supercharger 12 according to the present invention is shown in FIG. 2A and a top view of the screw compressor type supercharger 12 is shown in FIG. 2B. A supercharger pulley 18 is attached to the screw compressor type supercharger 12 at a front (outlet) end 12a of the supercharger and the throttle body 16 is attached at a rearward end 12b. While the supercharger is shown as having the outlet end to the front, belt drives may also be provided to position the inlet end of the supercharger to the front and the supercharger driven from the rear, and such variations are intended to come within the scope of the present invention. The supercharger includes a housing 13 having a length L, an inlet end wall 51 behind the housing 13, and the outlet end wall 47 ahead of the housing 13.

A cross-sectional view of the screw compressor type supercharger 12 taken along line 3-3 of FIG. 2B is shown in FIG. 3. A first rotor 24 and a second rotor 26 are rotatably housed in a housing 13 of the screw compressor type supercharger 12. The rotors 24 and 26 are turned by the pulley 18 and draw ambient air 28 through the throttle body 16 and through the rear (inlet) end 12b and into the screw compressor type supercharger 12. The ambient air is compressed as it passes through the screw compressor type supercharger 12 by the rotors 24 and 26. The compressed air 29 is pumped through compressed air passage 30 and through the intercooler 22 and the intake manifold 20 into the engine 10.

The power produced by a supercharging internal combustion engine 10 is generally increased by increasing the supercharger 12 boost pressure. Increasing the boost pressure necessarily results in increased temperature of the compressed air 29 being pumped into the engine 10. Such temperature increase is proportional to the absolute pressure increase (the Ideal Gas Law) and further increased by less than 100 percent supercharger efficiency. The hot air flowing through the supercharger further heats mechanical components and lubrication oil of the supercharger. The air flow is heated as it passes from the inlet end 12b to the outlet end 12a, and as a result, the components near the front 12a of the supercharger 12 experience significantly greater temperature rise than near the rear 12b. Such heating of elements near the front 12a of the supercharger 12 has resulted in reduced performance, wear to components, and mechanical failures.

The supercharged engine 12, a heat exchanger 45, and coolant lines 40a, 40b, and 40c according to the present invention are shown in FIG. 4. Increased pressure (i.e., boost) often requires intercooling to prevent detonation. The air to liquid coolant intercooler 22 is popular for many installations because of the compact size and the elimination of a cooling air flow through the intercooler required by air to air intercoolers. The intercooler 22 is conveniently mounted between the supercharger 12 and the intake manifold 20. The circulating liquid coolant is cooled by air 43 in a radiator 45 which is generally mounted in the front of the car. The line 40a carries the coolant 41 from a heat exchanger coolant outlet 45b on the heat exchanger 45 to an intercooler coolant inlet 22a on the intercooler 22 through a pump 44. The line 40b carries the coolant 41 from an intercooler coolant outlet 22b on the intercooler 22 to a supercharger coolant inlet 12a on the supercharger 12. The line 40c carries the coolant 41 from a supercharger coolant outlet 12b on the supercharger 12 back to a heat exchanger coolant inlet 45a on the heat exchanger 45 to complete the cycle.

The pump 44 may be a mechanical pump or an electric pump. When an electric pump is used the pump may be controlled, for example using a pulse width modulated power signal, to provide the required coolant flow 41 to the supercharger 12.

Two restricted flows 41a and 41b connect the line 40b to the line 40c. The restricted flow 41a passed through a fixed restriction 48 and the flow 41b passes through a variable restriction 49 to control the amount of coolant 41 flowing through the supercharger 12. The variable restriction 49 may be thermostatically controlled and is preferably controlled based on supercharger 12 temperature.

Figure 5:
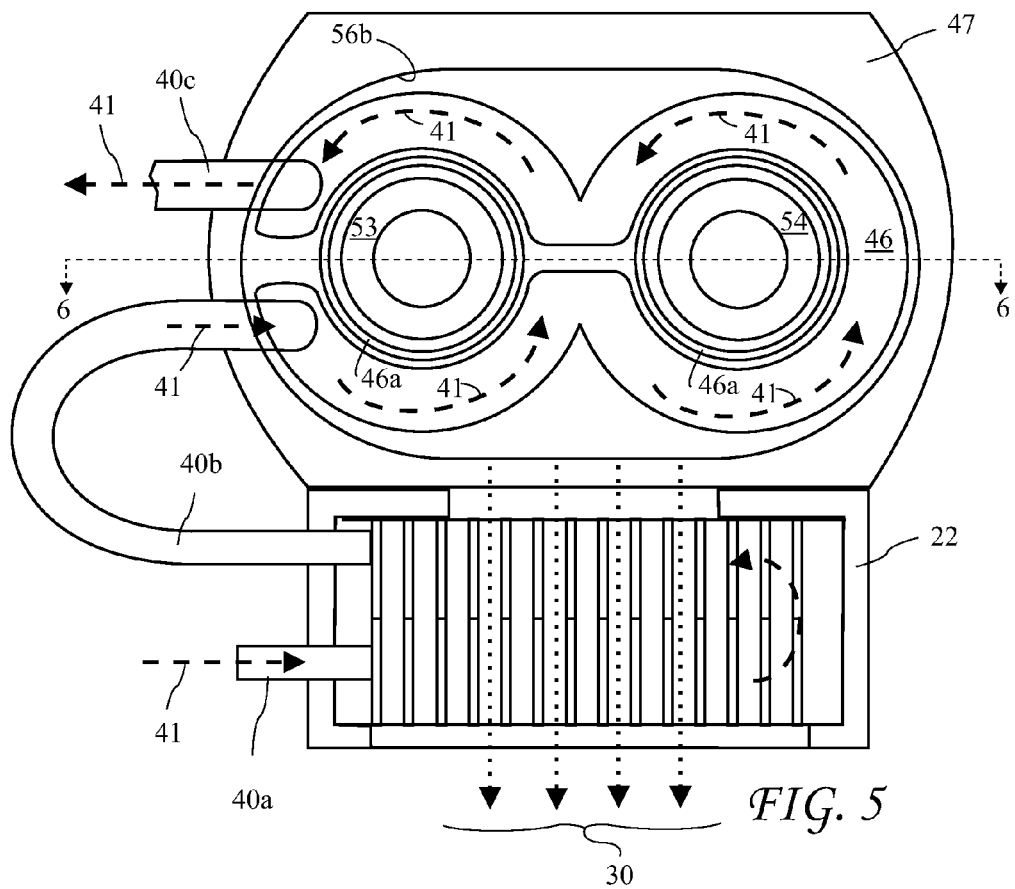
FIG. 5 is a front view of a supercharger outlet end wall and intercooler coolant flow according to the present invention.
Figure 6:
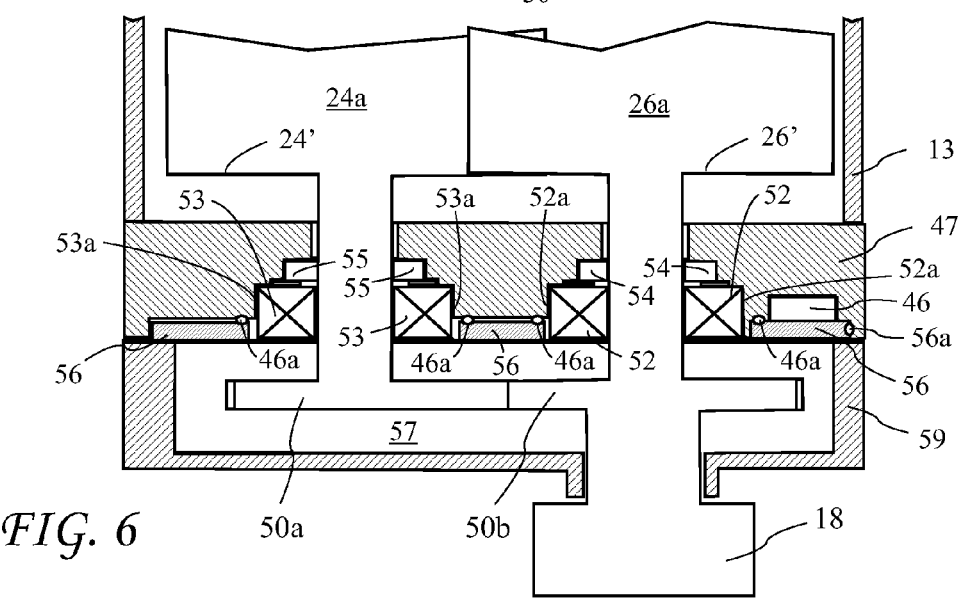
FIG. 6 is a cross-sectional view of the supercharger outlet end wall taken along line 6-6 of FIG. 5.

A front view of a supercharger outlet end wall 47 and coolant flow 41 according to the present invention is shown in FIG. 5 and a cross-sectional view of the supercharger outlet end wall 47 and discharge end cover 59 taken along line 6-6 of FIG. 5 is shown in FIG. 6. As the boost is increased, the temperature of the compressed air 30 pumped into the engine 10 also increases, particularly at the outlet end 12a of the supercharger (see FIG. 2A). The outlet end wall 47 is in contact with the hot compressed air 30 causing the temperature of the outlet end wall 47, the bearings 52 and 53, the shaft seals 54 and 55, the rotor drive gears 50a and 50b, and lubricating oil inside the discharge end cover 59 to increase under high boost, reducing performance and increases wear and failures.

The outlet end wall 47 is generally made of aluminium and includes seats 52a and 53a for the bearings 52 and 53. Because of the high thermal expansion of aluminum, outlet end wall 47 does not maintain the centerdistance of the gears 50a and 50b and the rotors 24 and 26 when the hot compressed air 30 heats the outlet end wall 47 to high operating temperatures. The gears 50a and 50b are made of steel having a coefficient of thermal expansion different from the outlet end wall 47 and as a result the gear mesh of the gears 50a and 50b is affected by the expansion of the outlet end wall 47. The supercharger inlet end wall is also made of aluminium but is continuously cooled by the inlet air 28 at ambient temperature, and as a result, the outlet ends 24a and 26a of the rotors 24 and 26 do not maintain the same rotor centerdistance as the inlet ends. Heat is also generated by the rotor drive gears 50a and 50b, the pulley 18, the bearings 52 and 53 and the seals 54 and 55.

Some of the heat is further transferred to oil in the space 57 between the discharge end cover 59 and the outlet end wall 47. The oil is continuously thrown against neighbouring walls, and additionally, a number of mounting bosses spaced around the interior of the discharge end cover 59 tend to collect the oil in the top half of the discharge end cover 59 delaying the oil from running down into the oil sump, resulting in the hot oil heating the discharge end cover 59. The lubricating quality of the oil may be reduced when the oil is heated excessively resulting in wear to the gears 50a and 50b.

The supercharger cooling system according to the present invention cools the outlet end wall 47 thereby effectively cooling the bearing seats 52a and 53a, the bearings 52 and 53, and the seals 54 and 55, and creating a barrier to heat from the hot compressed air 30 reaching the gears 50a and 50b. As a result, the rotor centerdistance in the outlet end 12a remains very close to the rotor centerdistance in the inlet end 12b, and proper gear mesh is maintained, thereby improving performance and reducing wear and failures. Additionally, reducing expansion allows the rotor to rotor centerdistance to be kept small for optimum performance and safe operation.

More preferably, the flow 41 through the liquid coolant channel 46 circles around the outside radii of the seats 52a and 53a of the two bearings 52 and 53 to cool the seats 52a and 53a, the bearings 52 and 53, and the outlet end wall 47. Cooling the outlet end wall 47 contributes to maintaining the centerdistance between the rotors and the gears, even under high boost conditions. Cooling the bearing seats 52a and 53a also helps to maintain an interference fit of the bearings 52 and 53 to the bearing seats 52a and 53a. Cooling the outlet end wall 47 also provides a barrier to heat flowing from the hot compressed air flow 30 through the outlet end wall 47 and into the space 57 inside the discharge end cover 59, thereby preventing or reducing heating of the gears 50a and 50b and the oil residing in the space 57.

Figures 7A, 7B:
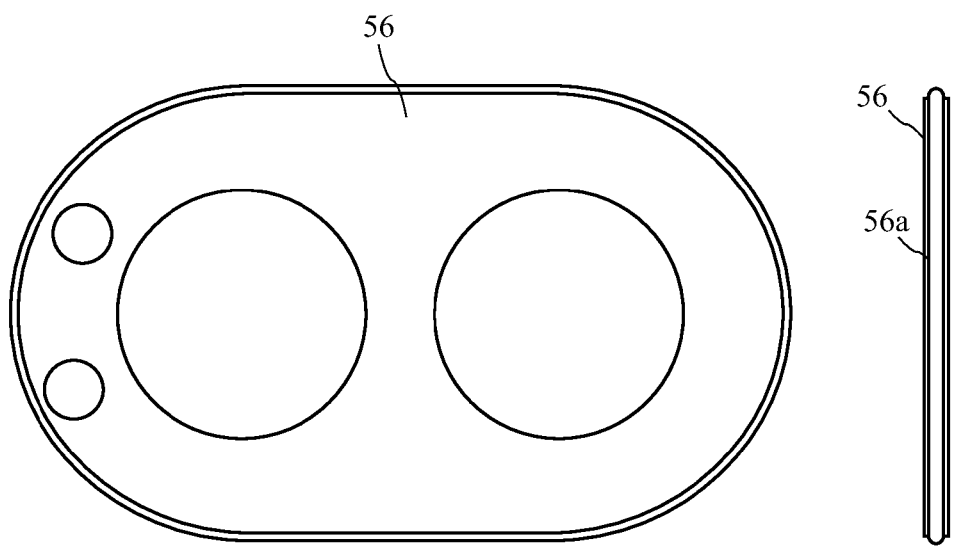
FIG. 7A is a front view of a coolant channel cover according to the present invention.
FIG. 7B is an edge view of the coolant channel cover according to the present invention.

A front view of a coolant channel cover 56 is shown in FIG. 7A and an edge view of the coolant channel cover 56 is shown in FIG. 7B. The coolant channel cover 56 includes an O-ring 56a circling it's outside edge for sealing outside the coolant flow 41 against a recess edge of the outlet end wall 47. O-rings 46a (see FIG. 6) provide a second seal between the outlet end wall 47 and the coolant channel cover 56 for sealing inside the coolant flow 41.

The present invention reduces heating of the discharge end cover 59 because a rear face of the cooling channel cover 56 is directly cooled by the liquid coolant 41 in channel 46. The oil in the space 57 is exposed to a front face of the cooling channel cover 56 and is cooled as the oil runs down the front face of the cooling channel cover 56.

Figure 8:
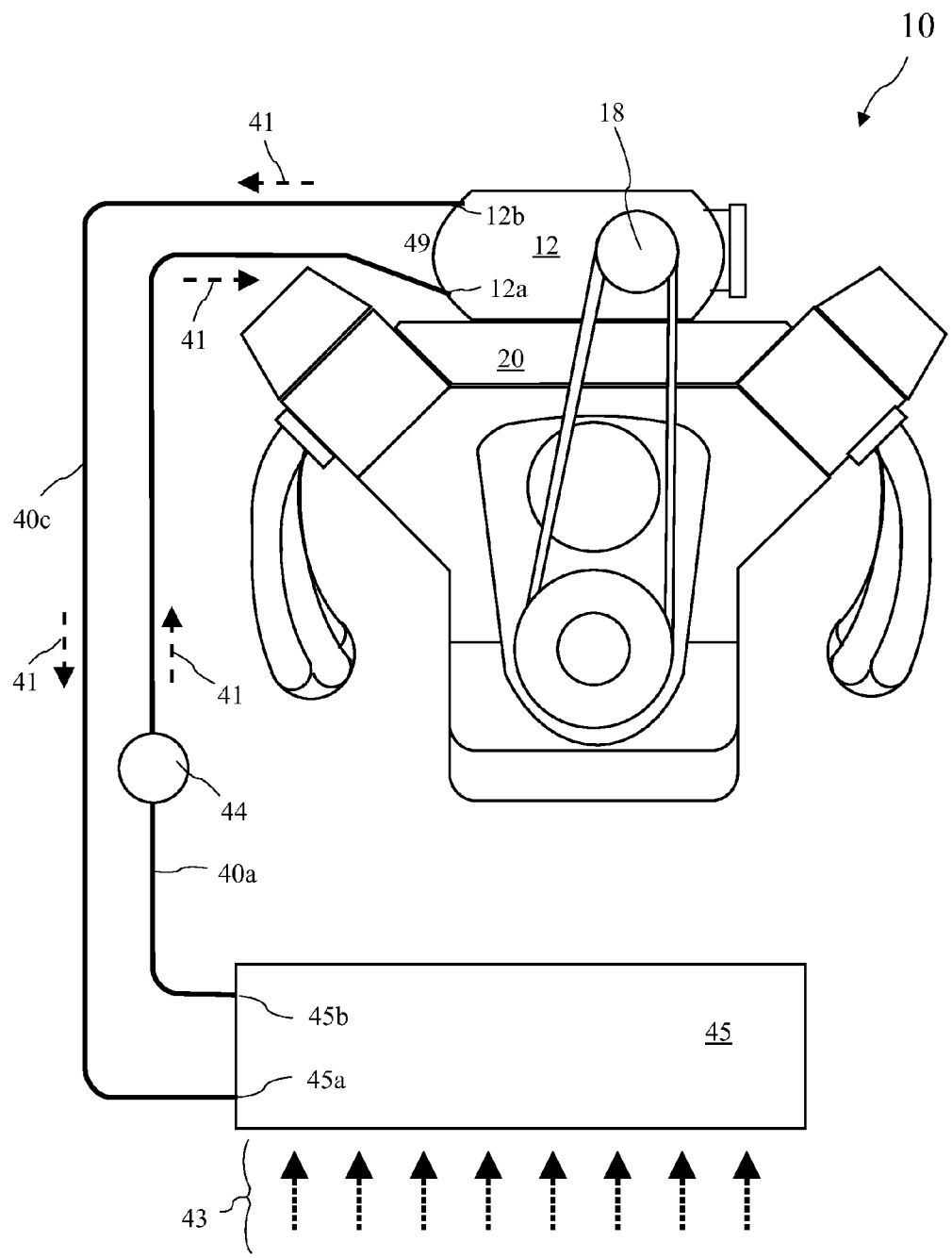
FIG. 8 shows the supercharged engine, a heat exchanger, and coolant lines according to the present invention.

A supercharged engine 10', the heat exchanger 24, and coolant lines are shown in FIG. 8. The supercharged engine 10' is similar to the supercharged engine 10 but does not include an intercooler. The heat exchanger coolant outlet 45b is connected to the supercharger coolant inlet 12a.

Figure 9:
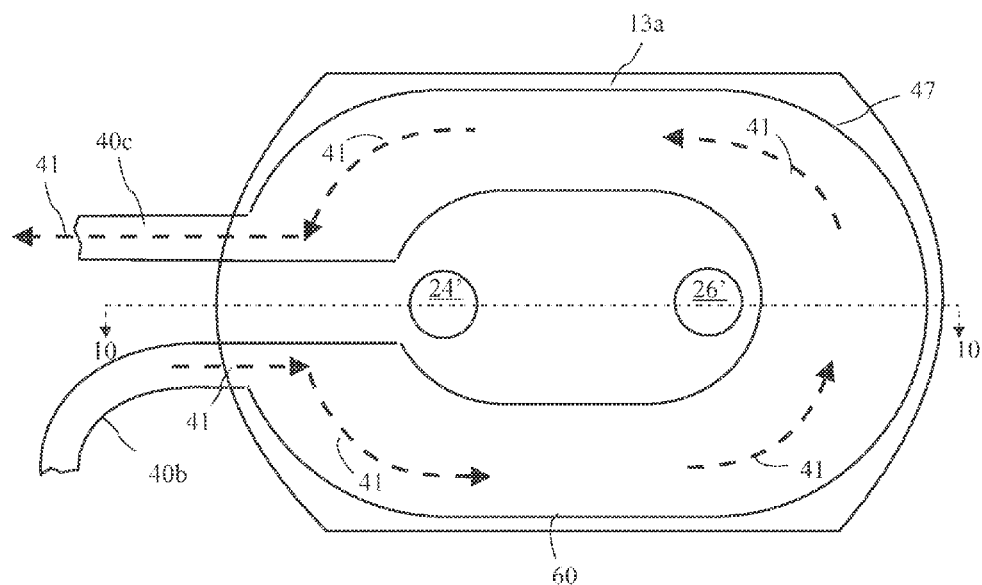
FIG. 9 shows a cutaway view of the supercharger housing proximal to the outlet end wall showing a coolant path according to the present invention.
Figure 10:
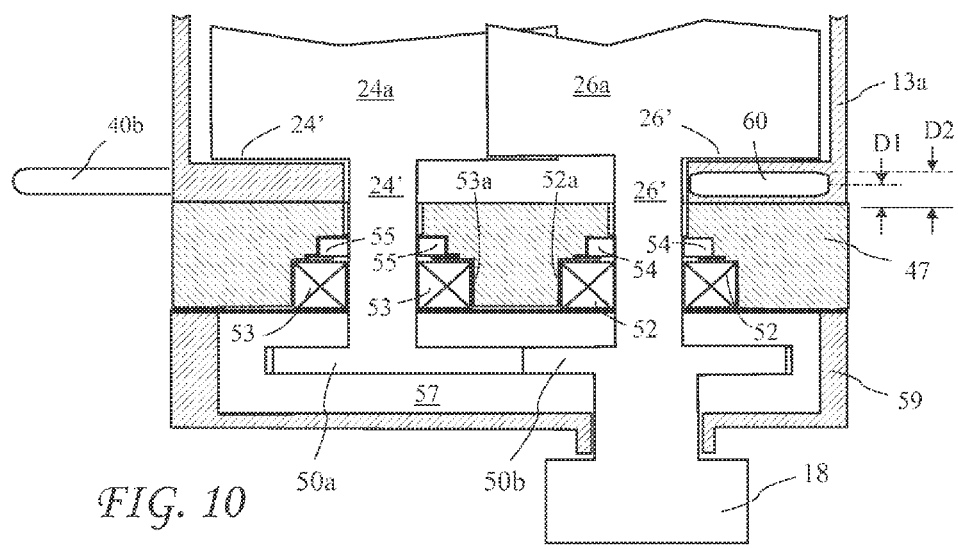
FIG. 10 shows a cross-sectional view of the supercharger housing proximal to the outlet end wall taken along line 10-10 of FIG. 9 showing a coolant path according to the present invention.

In another embodiment, a liquid coolant channel between forward edges 24' and 26' of the rotors 24 and 26 respectively and the bearings 52 and 53 creates a barrier to heat from the hot compressed air 30 reaching the gears 50a and 50b improving performance and reducing wear and failures. A cutaway view of a second supercharger housing 13a proximal to the outlet end wall 47 showing a coolant path 60 through the housing 13a is shown in FIG. 9 and a cross-sectional view of the supercharger housing 13a proximal to the outlet end wall 47 taken along line 10-10 of FIG. 9 showing the coolant path 60 is shown in FIG. 10. The rotors include rotor shaft 24' and 26' connecting the rotors to the gears 50a and 50b and the coolant path 60 circles the rotor shafts. The coolant path 60 is centered a distance [[D]] D1 or alternatively no portion of the supercharger coolant path is greater than a distance D2, from an outlet end wall portion of the supercharger, from the outlet end wall 47. The distances D1 and D2 are preferably less than three inches and more preferably less than two inches.

Figure 11:
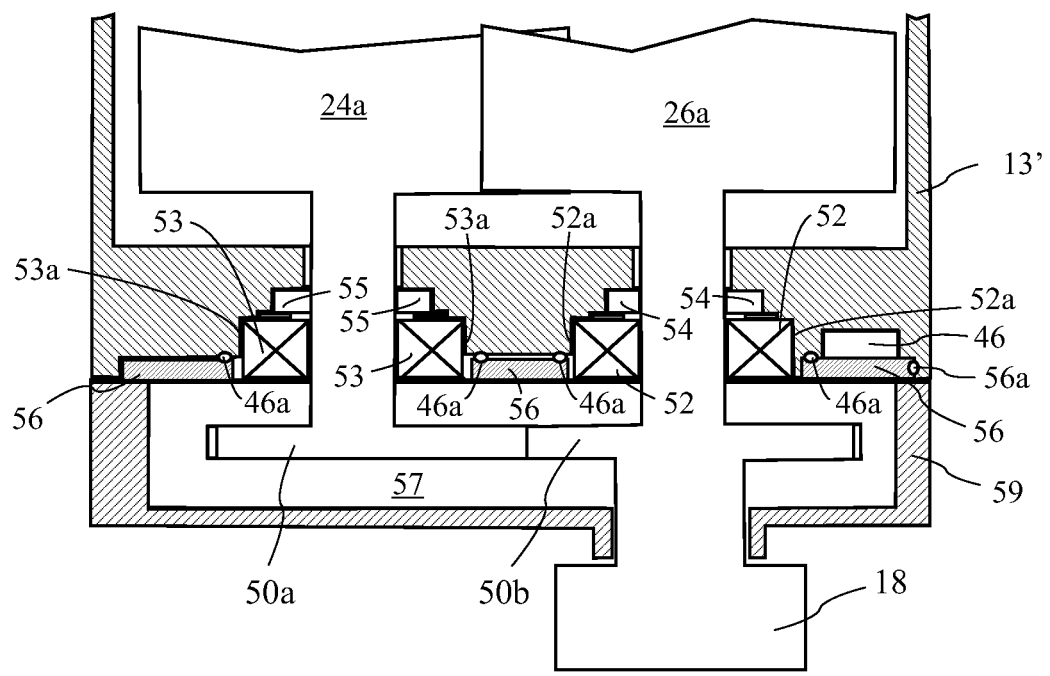
FIG. 11 shows a cross-sectional view of a single piece supercharger housing and outlet end wall proximal to the outlet end wall taken along line 6-6 of FIG. 5 showing a coolant path according to the present invention.

A cross-sectional view of a single piece supercharger housing and outlet end wall 13' taken along line 6-6 of FIG. 5 showing the coolant channel 46 is shown in FIG. 11. The single piece supercharger housing and outlet end wall 13' is a single piece, and is otherwise similar to the supercharger housing and the outlet end wall 47.

Space in the engine compartment is often limited and an embodiment of the supercharger cooling system according to the present invention described below uses an existing engine cooling system to provide the desired cooling without adding significant additional parts. The existing engine cooling system includes a radiator mounted in the front of the car and a water pump. The water pump circulates the existing liquid coolant through the radiator and the engine. The water pump may also be used to circulate a part of the total coolant flow to the cooling channel 46 in the outlet end wall 47 to cool the supercharger. A parallel circuit comprising the lines 40a, and 40c is connected to the existing vehicle cooling system with the line 40a connected to a higher pressure point and the line 40c to a lower pressure point. The amount of liquid coolant cycled through the cooling channel 46 is controlled by the two restrictions 48 and 49. By altering the size of the two restrictions 8 and 9 each flow can be determined for optimum cooling performance.

While the above description focuses on a screw type supercharger, those skilled in the art will recognize that the present invention is equally applicable to a roots type supercharger and such cooling for a roots type supercharger is intended to come within the scope of the present invention.

The liquid coolant is often a water based coolant but may also be a Propylene glycol coolant or any other liquid coolant.

While the invention herein disclosed has been described by means of specific embodiments and applications thereof, numerous modifications and variations could be made thereto by those skilled in the art without departing from the scope of the invention set forth in the claims.

I claim:

1. An engine including a supercharger having an outlet end cooling system comprising:
    an engine intake manifold providing a flow of compressed air into the engine;
    a supercharger in fluid communication with the engine intake manifold providing the flow of compressed air into the intake manifold;
    an inlet end of the supercharger receiving ambient air;
    an outlet end of the supercharger opposite the inlet end of the supercharger;
    a path for the ambient air from the inlet end of the supercharger to the outlet end of the supercharger with increasing pressure and temperature as the ambient air is compressed along the path to produce the flow of compressed air;
    a coolant to air heat exchanger for cooling a coolant flow;
    a supercharger coolant inlet in fluid communication with the coolant to air heat exchanger to receive the cooled coolant flow;
    a supercharger coolant path residing proximal to the outlet end of the supercharger, no portion of the supercharger coolant path greater than three inches from an outlet end wall portion of the supercharger, the supercharger coolant path in fluid communication with the supercharger coolant inlet to receive the cooled coolant flow;
    a supercharger coolant outlet in fluid communication with the supercharger coolant path to receive the coolant flow from the supercharger coolant path; and
    the supercharger coolant outlet in fluid communication with the coolant to air heat exchanger to return the coolant flow to the coolant to air heat exchanger.

2. The engine of claim 1, wherein the supercharger coolant path is in a supercharger housing of the supercharger.

3. The engine of claim 2, wherein the supercharger coolant path is less than three inches from the outlet end wall of the supercharger.

4. The engine of claim 3, wherein the supercharger coolant path is less than two inches from the outlet end wall of the supercharger.

5. The engine of claim 2, wherein the supercharger coolant flow resided between the rotors and the gears and provides a barrier to heat flowing to the gears.

6. The engine of claim 1, wherein the supercharger coolant path is between forward edges of the rotors and bearings in the outlet end of the supercharger.

7. The engine of claim 1, wherein the heat exchanger is a vehicle radiator.

8. The engine of claim 7, wherein the coolant is pumped by a vehicle water pump.

9. The engine of claim 1, wherein a bypass connects the supercharger coolant inlet to the supercharger coolant outlet bypassing the supercharger coolant path to reduce supercharger cooling.

10. The engine of claim 1, wherein a first fixed bypass connects the supercharger coolant inlet to the supercharger coolant outlet bypassing the supercharger coolant path to reduce supercharger cooling and a second variable bypass connected the supercharger coolant inlet to the supercharger coolant outlet bypassing the supercharger coolant path to reduce supercharger cooling.

11. The engine of claim 10, wherein the second variable bypass is thermostatically controlled to control the supercharger cooling.

12. The engine of claim 1, wherein:
    a discharge end cover resides at the outlet end of the supercharger; and
    the supercharger coolant path resides between outlet ends of supercharger rotors and the discharge end cover.

13. The engine of claim 1, wherein:
    a supercharger pulley resides at the outlet end of the supercharger; and
    the supercharger coolant path resides between the supercharger rotors and the supercharger pulley.

14. The engine of claim 1, wherein:
    rotor shafts connect the rotors to rotor gears driving the rotors; and
    the supercharger coolant path circles the rotor shafts.

15. The engine of claim 1, wherein the supercharger is a screw type supercharger.

16. The engine of claim 1, wherein the supercharger is a roots type supercharger.

* * * * *